US011507719B1

United States Patent
Kundu et al.

(10) Patent No.: US 11,507,719 B1
(45) Date of Patent: Nov. 22, 2022

(54) ACCELERATING FORMAL PROPERTY VERIFICATION ACROSS DESIGN VERSIONS USING SEQUENTIAL EQUIVALENCE CHECKING

(71) Applicant: Synopsys, Inc., Mountain View, CA (US)

(72) Inventors: Sudipta Kundu, Hillsboro, OR (US); Mitesh Jain, Hillsboro, OR (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/170,843

(22) Filed: Feb. 8, 2021

Related U.S. Application Data

(60) Provisional application No. 62/970,707, filed on Feb. 6, 2020.

(51) Int. Cl.
G06F 30/3323 (2020.01)
G06F 30/323 (2020.01)
G06F 119/02 (2020.01)
G06F 111/04 (2020.01)

(52) U.S. Cl.
CPC ........ *G06F 30/3323* (2020.01); *G06F 30/323* (2020.01); *G06F 2111/04* (2020.01); *G06F 2119/02* (2020.01)

(58) Field of Classification Search
USPC ...................................................... 716/100
See application file for complete search history.

(56) References Cited

U.S. PATENT DOCUMENTS 8,713,515 B1 * 4/2014 Biggerstaff ............... G06F 8/72
717/137
2010/0107131 A1 * 4/2010 Bjesse ................ G06F 30/3323
716/106

* cited by examiner

Primary Examiner — Bryce M Aisaka
(74) Attorney, Agent, or Firm — Nicholson De Vos Webster & Elliott LLP; Judith Szepesi

(57) ABSTRACT

A system and method for providing formal property verification across circuit design versions is described. In one embodiment, the system receives a first version and a second version of a circuit design. The received first version has a first set of constraints, a first set of next-state functions representing the first version of the circuit design, and a first property that has been verified as true for the first version of the circuit design. The received second version has a second set of constraints, a second set of next-state functions representing the second version of the circuit design, and a second property for the second version of the circuit design. The described embodiments further construct a composite circuit design based on the first set of constraints, the first set of next-state functions, and the first property and further based on the second set of constraints, the second set of next-state functions, and the second property. A third property is constructed for the composite circuit design in which the first property implies the second property. Some described embodiments output a proof or a counterexample for the second circuit design, based on the proof of the third property for the composite circuit design, since a user of the system and method is trying to verify the second circuit design, not the composite circuit design.

20 Claims, 17 Drawing Sheets

ACCELERATING FORMAL PROPERTY VERIFICATION ACROSS DESIGN VERSIONS USING SEQUENTIAL EQUIVALENCE CHECKING

RELATED APPLICATION

This application claims priority to U.S. Provisional Patent Application 62/970,707, filed Feb. 6, 2020, which is herein incorporated by reference in its entirety.

TECHNICAL FIELD

The present disclosure generally relates to circuit verification systems, and more particularly to a system and method for accelerating formal property verification across different design versions of a circuit.

BACKGROUND

Formal property verification (FPV) of a circuit design using a formal verification system typically involves a circuit design under verification and a set of assumptions describing the constraints on the environment in which the circuit design will operate and a set of properties describing the correctness of the systems. Given a circuit design, constraints, and a corresponding set of properties, verification engineers use FPV systems to prove or disprove the properties for a circuit design with constraints. At each modification to the circuit design or the property, most formal verification system may spend a great amount of time re-verifying the set of properties on the new design.

SUMMARY

The embodiments described herein provide a method, system, and apparatus for accelerating formal property verification across design versions using sequential equivalence checking. In one embodiment, the system receives a first version of a circuit design and stores the first version of the circuit design in a memory, where the received first version has a first set of constraints, a first set of next-state functions representing the first version of the circuit design, and a first property that has been verified as true for the first version of the circuit design. The system also receives a second version of a circuit design and stores the second version of the circuit design in the memory, where the received second version has a second set of constraints, a second set of next-state functions representing the second version of the circuit design, and a second property for the second version of the circuit design.

The described embodiments further construct a composite circuit design based on the first set of constraints, the first set of next-state functions, and the first property and further based on the second set of constraints, the second set of next-state functions, and the second property. A third property is constructed for the composite circuit design in which the first property implies the second property. Similarly, in some embodiments, a property is constructed for other properties of the third circuit design, in which a property of the first circuit design implies a matching property of the second circuit design.

Constructing the composite circuit design can further comprise merging a first set of inputs of the first version of the circuit design and a second set of inputs of the second version of the circuit design to form inputs of the composite circuit design.

Constructing the composite circuit design can further comprise determining structurally equivalent nets in the first circuit design and the second circuit design; and merging the determined structurally equivalent nets in the composite circuit design.

Constructing the composite circuit design can further comprise (wherein the first circuit design has a fifth property and the second circuit design has a sixth property, and wherein the fifth property and the sixth property match) constructing a fourth property for the composite circuit design in which the fifth property of the first circuit design implies the sixth property of the second circuit design. Constructing the composite circuit design can further comprise matching the second property of the second circuit design to the first property of the first circuit design and using the matched first property and second property to construct the third property of the composite circuit design.

In described embodiments, once the composite circuit design is constructed, the system and method further determine semantic equivalent states for the composite circuit design; and use the determined semantic equivalent states to analyze correctness of the third property of the composite circuit design.

Described embodiments also generating for the composite circuit design one of the following: a proof that the third property is true for the composite circuit design; a counter-example trace for the composite circuit design; and a result of inconclusive.

Described embodiments output a proof or a counterexample for the second circuit design, based on the proof of the third property for the composite circuit design, since a user of the system and method is trying to verify the second circuit design, not the composite circuit design.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
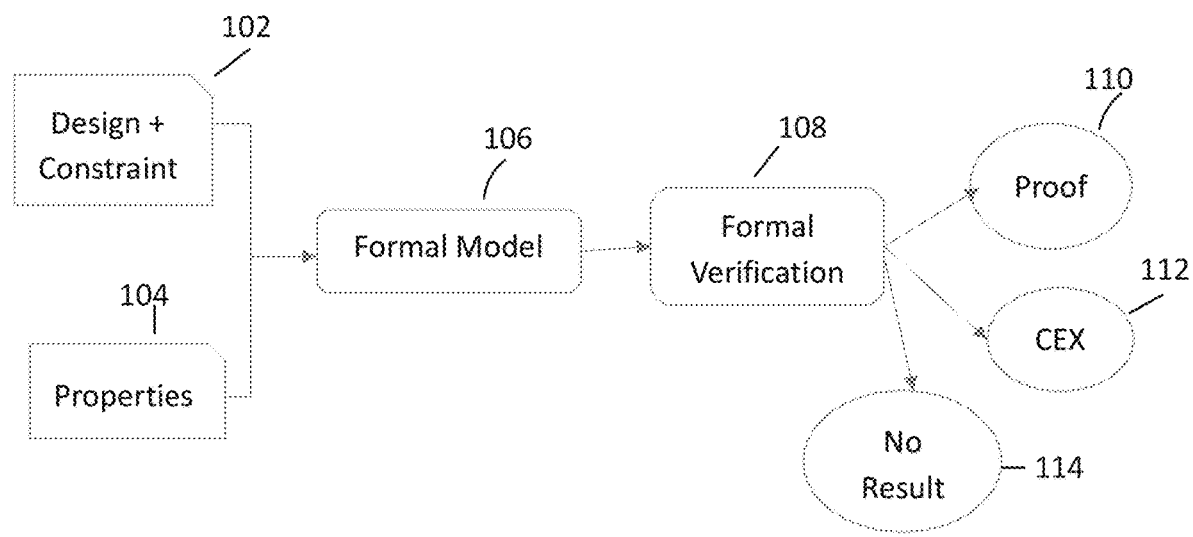
FIG. 1 illustrates an example of property-based verification for a circuit design.

The present disclosure provides a system and method to use sequential equivalence checking to accelerate formal property verification across two versions of a circuit design. As an example, the described system and method could be incorporated into Formal Property Verification (FPV) software, which verifies that under given constraints, does a circuit design meets certain properties. The described system and method leverage the effort to verify a property in a circuit design to verify the property in subsequent versions of the circuit design. The described embodiments provide a way to transfer the results of verification between two versions of the circuit design. If a first version of a circuit design has been verified, then the method may determine that either a part or all of the first design and the subsequent design are semantically equivalent and therefore it does not need to verify some or all of the subsequent designs. A determination that re-verification is not needed for either a part or all of a circuit design results in savings of time and effort in the circuit design and verification process. Syntactic equivalence is an equivalence that is based on the syntax of the circuit designs. For example, "X+5" is not syntactically equivalent to "X+3+2". In contrast, semantic equivalence is an equivalence that is based on the behavior of the circuit designs. For example, "(X+Y)*Z" were X, Y and Z are integers is semantically equivalent (but not syntactically equivalent) to "(X*Z)+(Y*Z)" because given same inputs, they yield the same result, i.e., have the same behavior.

The described embodiments relate to an improved EDA software system and associated methods for use during the development of integrated circuit (IC) designs that are subsequently utilized in the fabrication of physical IC devices (chips) based on the circuit designs. The figures and the following detailed description signify embodiments and/or examples by way of illustration only, with various features, structures or characteristics described together in a single embodiment to streamline the disclosure. Variations of any of the elements, processes, machines, systems, manufactures or compositions disclosed by such exemplary embodiments and/or examples will be readily recognized and may be used in commerce without departing from the principles of what is claimed.

The figures and detailed description may also signify, implicitly or explicitly, advantages and improvements of a subset of the exemplary embodiments described herein. In the figures and detailed description, numerous specific details may be described to provide a thorough understanding of one or more of the exemplary embodiments. In the interest of not obscuring the presentation of the present embodiments, in the following detailed description, some processing steps or operations that are known in the art may have been combined for presentation and for illustration purposes and in some instances may have not been described in detail. However, a person skilled in the art will recognize that these embodiments may be used in commerce without these specific details or with equivalents thereof. In other instances, well-known processes and devices are not described in detail as not to unnecessarily obscure aspects of these embodiments. In other instances, some processing steps or operations that are known in the art may not be described at all. The following description is instead focused on the distinctive features or elements of various embodiments. Furthermore, while this description may refer to some components of the structure in the singular tense, more than one component may be depicted throughout the figures and like components may be labeled with like numerals.

The present disclosure describes a system and method that enables a verification engineer to focus on the change in the status (proven, falsified, or inconclusive) of a property across two versions of a circuit design. A property is a desirable behavior of a circuit design, such as, having an output that is always a positive number. A property should be true for all input that satisfy constraints for the circuit design. Some circuit designs have a set of properties (desirable behaviors) for the design. When verifying a property on a new version of a circuit design, an engineer attempts to answer the following questions.

Does the modification add any undesirable behavior (falsifying a property)?

If yes, how to root cause the failure to a subset of modifications?

If not, how to prove the properties in the new version of the circuit design?

These questions highlight the importance of change in the status of a property.

Given an updated subsequent version of a circuit design, some circuit verification systems may start verifying the properties on it in isolation of (1) the previous version of the circuit design and (2) the effort to verify those properties on the previous circuit design. In contrast, the embodiments described herein exploit the semantic sequential differences in the two versions of the circuit design. The described embodiments use the already-existing proof of correctness for the older version of the circuit design to either (1) automatically reconstruct the proof for a property for the new version of the circuit design, or (2) provide a counter-example that highlights the observable difference in the two circuit designs with respect to a property.

In circuit verification system, writing and running additional regression tests to uncover undesirable behavior or reconstructing the proofs of correctness (by a user or the automated verification tool) may have several drawbacks: Regression tests do not provide the trust in correctness that formal verification provides. Reconstructing the proof of correctness even for small functional changes in the circuit design is often as hard as it was the first time. This task is especially tedious in presence of automated verification tools that are intended to work out-of-the-box.

In contrast, a system and method in accordance with the described embodiments, deduces the semantic sequential equivalences, as opposed to syntactic differences or simple combinational differences between the two circuit designs. The described embodiments eliminate false positives resulting from non-functional changes (like change in names of the variables to describe the design, refactoring of design, or optimizations to reduce power consumption).

Furthermore, a method in accordance with the described embodiments effectively analyzes a property with respect to the semantic changes between D and D' (i.e., between the first and the second circuit designs). This is often more effective than verifying a property again on D'. Unlike other approaches, the described embodiments do not require a user to specify the sequentially equivalent points. Instead, the described embodiments deduce them automatically. Furthermore, the described embodiments use the inferred equivalences to reduce the size of the problem that needs to be handled by verification engines. Moreover, the described embodiments use the invariants found while proving D.p (a property of the first circuit design) to prove the property D.p=>D'.p (a property that a property of the first design implies a property of the second design). As a result, the resulting verification of the second circuit design is more cost-effective, especially when the D'.p is expected to hold. Conceptually, the semantic similarity information between D and D' enables the engines like Property Driven Reachability (PDR) that attempt to infer property directed inductive invariants to more effectively generate a new invariant that is sufficient to prove the property p' in D'.

For example, consider the case of clock-gating registers in a circuit design to save power consumption of the design. Clock-gating does not functionally change the circuit design. However, such a tool based on syntactic difference would show that the two versions of the circuit design are different. In contrast, the system and method described herein would conclude that the two circuit designs are semantically equivalent.

4) A counterexample trace that falsifies the property D.p=>D'.p can be used to localize the change in D' that results in different behavior in D and D' with respect to the property p. This information is extremely useful to the user to localize the change between the two circuit designs. Moreover, a bug found in regression is more likely to indicate a real problem in the new version of D' and therefore also more likely to be of value to a user.

There are several software systems that compute syntactic difference between two versions of programs. However, systems that rely on syntactic differences suffer from several false negatives. Recent work on differential assertion checking proposes to prove relative correctness of two versions of software program by constructing an equivalence checking problem and computing semantic differences between the programs. Neither of these approaches are feasible to verify the correctness of sequential hardware systems. Unlike a software system that is formalized as a transformational system that takes an input and produces an output, a hardware (sequential) system is formalized as a reactive system that is not expected to terminate. Therefore, methods to verify software systems cannot be directly applied to verification of hardware (sequential) systems.

Let D be a circuit design and p be a (safety) property that is not falsified in D. Note that a safety property describes the sequential behavior of a circuit design. If the property is not falsified, its status can be either (1) conclusively proven for all cycles or (2) proven to hold up to some number of cycles (called the safe depth). Let D' be a newer version of the circuit design D. D.p has been verified (proven or inconclusive with a safe depth) and D'.p needs to be verified. To verify D'.p, the described embodiments create a sequential equivalence checking verification problem between D and D' and check if the property D.p=>D'.p holds. There are three possible cases; if D.p=>D'.p is:

1. Proven:

If D.p was proven, then it can be inferred that p' holds in D'.

If D.p was inconclusive, the safe depth of D.p is the safe depth of D'.p.

2. Falsified:

Note that an implication D.p=>D'.p is falsified only if the antecedent evaluates to true and conclusion evaluates to false. This indicates that either D' introduced a bad observable behavior with respect to the property p; or the enhancements in the circuit design are no longer correctly specified by the property p and therefore either the circuit design or the property p must be fixed.

3. Inconclusive:

Safe depth of p' is equal to the minimum of the safe depth of D.p=>D'.p and safe depth of D.p.

FIG. 1 shows an example of property-based verification. As shown in FIG. 1, given a circuit design 102 (including design constraints), property-based verification requires the user to specify a set of properties 104 (often written in System Verilog Assertion language) that serves as the specification of the circuit design. The set of properties 104 captures the expected behavior of the circuit design. For example, it is expected that a traffic light controller always has the property that a green light is turned ON for exactly one route. Model checking is a formal verification technique that automatically inspects that the behaviors of the circuit design are a subset of the behaviors allowed by the properties. Since the technique is completely automatic, it has become the dominant conventional technique for formally verifying hardware systems. Moreover, in case a formal model of the circuit design fails to satisfy a property, the model checking technique can provide a concrete counterexample trace that describes an unexpected behavior of the design.

As shown in FIG. 1, a formal model 106 consists of transition function representing the circuit design and the properties (including the constraints that describe the operational state space of the circuit design). A formal verification tool 108 analyzes the correctness of the formal model and asserts one of the following: (1) the property holds ("Proof") 110, (2) property is falsified, and the tool provides a counterexample (CEX) 112 that indicates the failing scenario, or (3) inconclusive/No result 114, and the tool (often) provides a depth until which the property holds.

Over the last couple of decades, automated tools based on model checking and other static analysis have made significant headway in establishing the formal correctness of several industrial designs. Nevertheless, formal verification is still a niche and is not part of the regular regression flows. This is because current formal verification tools do not support iterative design changes. A typical process flow for providing formal verification is shown in FIG. 2.

Figure 2:
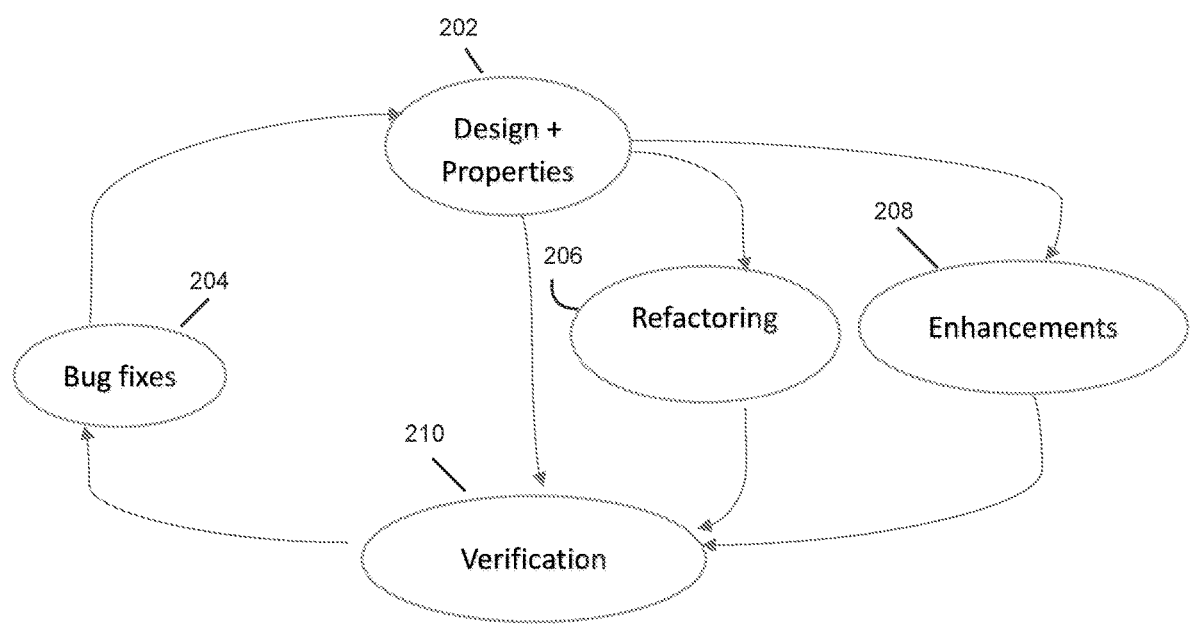
FIG. 2 illustrates a process flow for providing formal verification.

As shown in FIG. 2, a circuit design 202 may go through several changes during its life cycle. These changes can be due to bug-fixes 204 or feature enhancements 208 or even simple refactoring 206 of the code. The verification process 210 may find bugs in the functional aspect of the circuit design. Note that a bug could either be in the circuit design or it could be in specification of a property. In either case, the verification must be redone to ensure correctness of the circuit design. Such an iterative development is not supported in existing formal verification methods and any change triggers formal verification to start from scratch.

Figure 3:
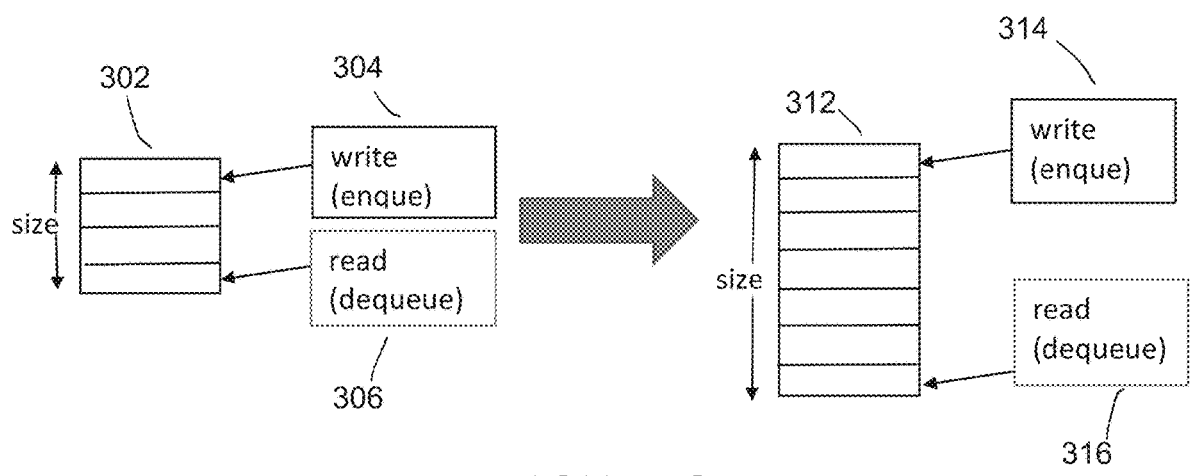
FIG. 3 illustrates an illustrative example of changes made to a First In, First Out (FIFO) buffer in different versions of a circuit design.

FIG. 3 is an illustrative example of an iterative development process of a simple First In, First Out (FIFO) buffer 302. A FIFO is a data buffer where the oldest (last) entry is processed first, i.e., data is read 306 in the order in which it was written 304. The size (number of data entries that the FIFO holds) is determined based on architectural considerations. Data integrity is an important property of the FIFO; informally, it states that the data read from the FIFO is the exactly equal to the data that was written to the FIFO. However, it is difficult to automatically prove this property. A verification engineer needs to specify and prove several auxiliary invariant properties of the FIFO. These invariants then can be used by the tools to automatically prove the data integrity property. However, it is difficult to identify appropriate invariants to prove a property and often requires significant expertise, time, and effort.

For example, assume that, later in the design cycle, the architectural considerations require that the size of the FIFO be changed, resulting in FIFO 312 in which data is read 316 in the order in which it was written 314. This is a simple design change but requires significant verification effort. All the invariants required to prove the data integrity property have to be specified and proven again. Model checking is fundamentally a hard problem and it is often the case that state-of-the-art tools take a long time to converge (prove or disprove) the properties. Moreover, a verification tool may not automatically converge on some of the hard properties and it may require a user to specify auxiliary invariants to assist the verification tool. This effort and time to verify the property must be reinvested every time there is a change in the circuit design. In general, every time the circuit design changes, all the properties must be re-verified. This may require reproving existing helper properties as well as writing new ones. Existing formal verification tools and methodology have very limited support that aligns with the stepwise design methodology.

The main idea of the described embodiments is to reduce the complexity of the verification of a property for a new version of a circuit design to the complexity of analyzing the difference between the two versions and utilize the proven properties in a previous version to automatically reconstruct the proof (or a counterexample) to a property in the new version of the circuit design. For example, let a verification problem for a circuit design D be the tuple <C, Tr, P>, where C is the set of constraints (initial and invariant constraints), Tr is the next-state function, and P is the set of properties. Initial constraints are a set of constraints that must hold at the start (time t=0) and invariant constraints are constraints that must hold at all times. Let V and V' be the verification problem for the two circuit designs D and D' respectively. A goal of the described embodiments is to infer the following:

Given a property p (in P and P'), is there a behavior that evaluates a property p differently in V and V'?

Given V and V', the described embodiments set up the sequential equivalence checking problem as follows. The verification problem $V_e$ is constructed. Verification problem $V_e$ is the composition of verification problems V and V' for the two circuit designs D and D' respectively. The method and system ensure next ensures that the V and V' have the same constraints.

Figure 4:
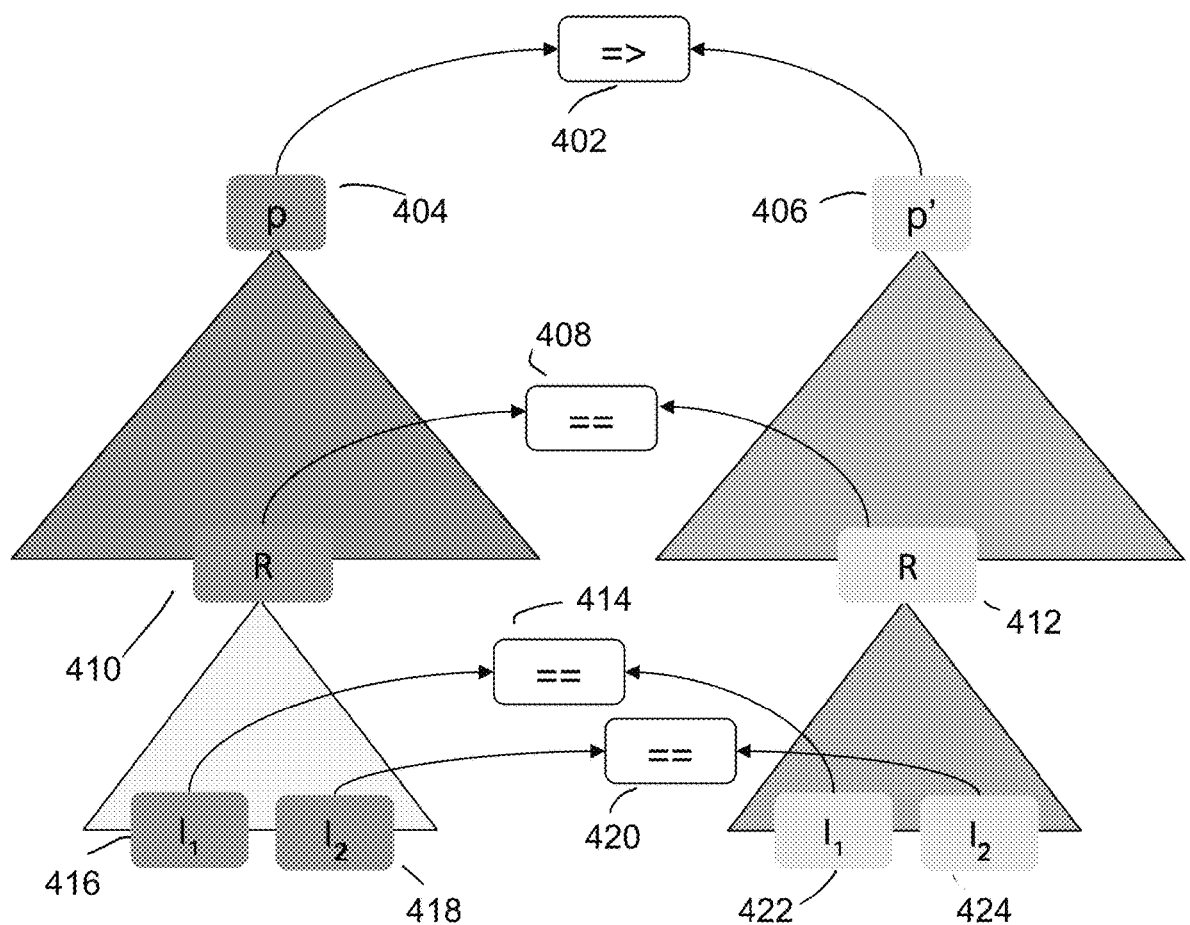
FIG. 4 illustrates an example of two versions of a circuit design.

Next, the next-state function of $V_e$ is constructed. The intent is to find a behavior in D and D' such that a property p in P and P' evaluates differently in the two circuit designs, i.e., given same input (and starting from the same initial state) is there a behavior that the property p evaluates differently. Therefore, the method assumes that the inputs to the D and D' are the same. The equivalences induced in the next-state function of $V_e$ is determined as a result of this assumption and the circuit design is simplified by merging structurally equivalent nodes. Intuitively, the next-state function of $V_e$ is the structurally reduced version of the composition of V and V'. This is illustrated in FIG. 4, which shows two versions D and D' of a circuit design. The circuit designs D and D' have two primary inputs $I_1$ 416, 422 and $I_2$ 418, 424 that are assumed to be equal. The equivalence 414, 420 induced by this assumption results in merging equivalent nodes in the Data Flow Graphs (DFGs) of $I_1$ and $I_2$ indicated by the overlapping DFGs in FIG. 5, as discussed below.

Next, in FIG. 4, for every property p in P and P', a new property P.p=>P'.p in V, is introduced 404, 402, 406. The symbol "=>" means "logical implication." Moreover, the described embodiments speculatively assume that the registers 410, 412 of D and D' with the same name are equal 408 and introduce corresponding proof obligations. Intuitively, internal equivalences of registers, if validated, are useful helper properties to effectively infer the truth value of P.p=>P'.p. This is extremely useful as it partitions the problem into proving the internal equivalences and proving the property P'.p 404, 402, 406 that only considers the semantic dissimilarities between D and D'.

Figure 5:
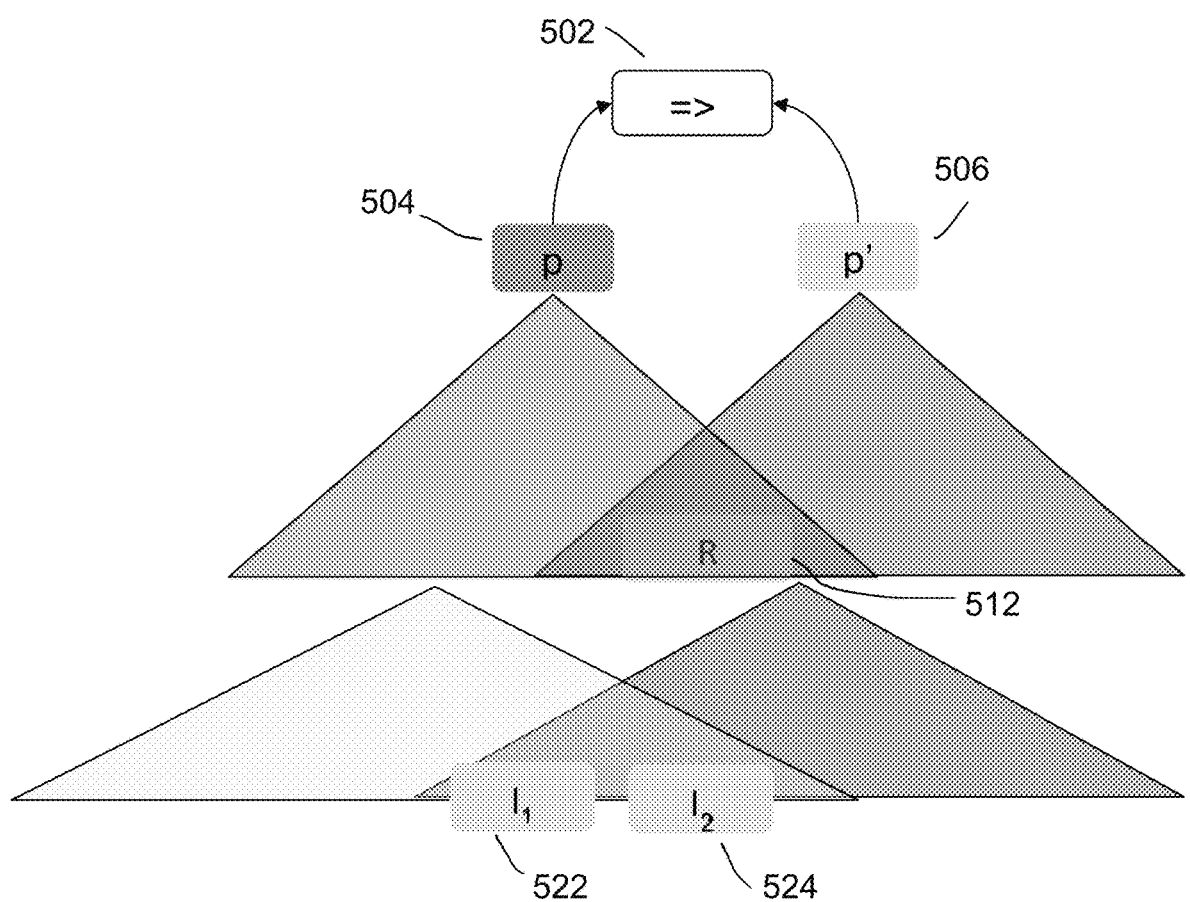
FIG. 5 illustrates an example of two versions of a circuit design having an equivalent register in the circuit designs.

FIG. 5 shows an example of two versions of a circuit design having an equivalent input 522 and an equivalent input 524. The circuit design also has an equivalent register R 512 in the circuit designs. For example, in FIG. 5 the internal register R in circuit design D and D' is mapped and the corresponding proof obligation 504, 506 are mapped to form P.p=>P'.p 504, 502, 506. Furthermore, when analyzing P.p=>P'.p 504, 502, 506, the reduced circuit design obtained by merging the equivalent nodes as a result of the assuming the internal equivalence of register R in the two circuit designs is considered.

Finally, this additional semantic similarity information along with the fact the property p holds in D verifies that P.p=>P'.p. Also, we can provide counterexample (CEX) trace for the falsified internal equivalences proof obligations. This provides a concrete behavior that is different between D and D', a feedback that is extremely useful to the designer to understand the difference. The described method is shown in FIGS. 6 and 7, which operate on a circuit model stored in a memory of a computer system (also called a data processor).

Figure 6:
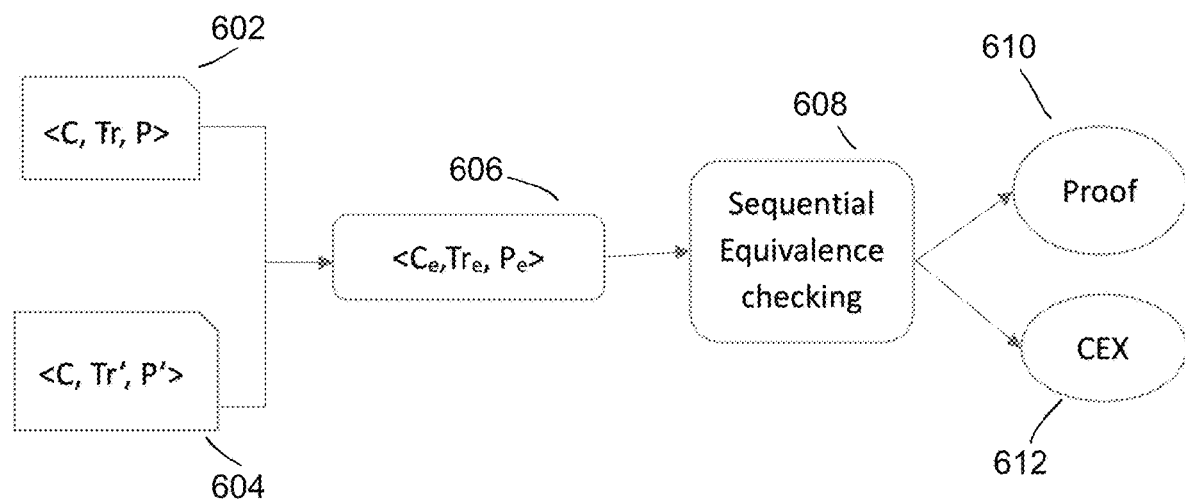
FIG. 6 illustrates a flowchart performed by a differential verification engine in an embodiment of the present disclosure.
Figure 7:
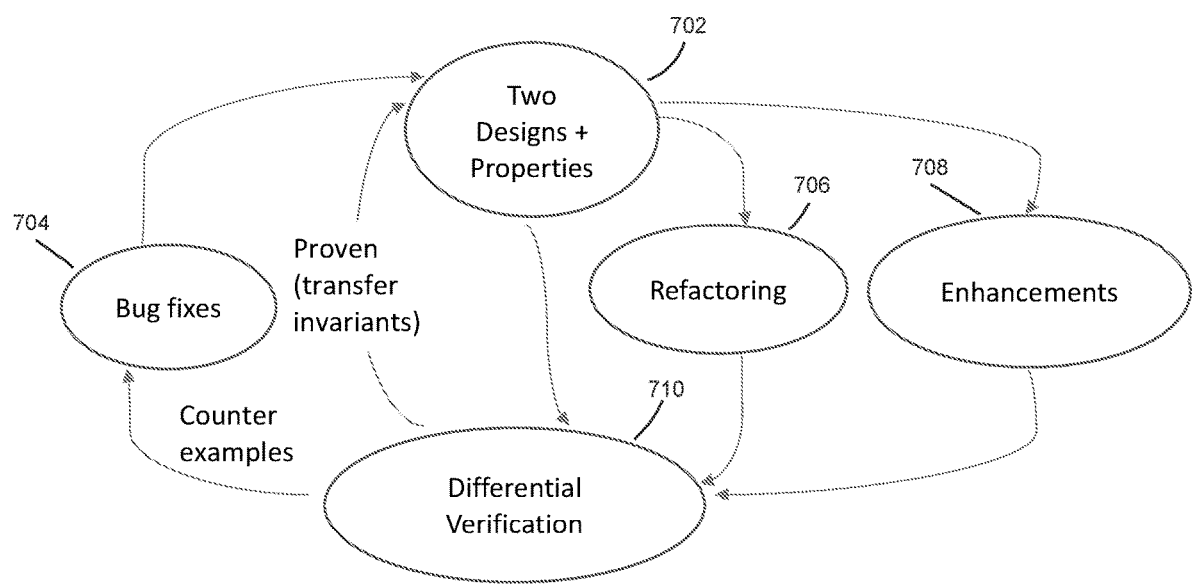
FIG. 7 illustrates a graph showing flow between the differential verification engine and the design process for multiple versions of a circuit design.

FIG. 6 is a flowchart performed by a differential verification engine in an embodiment. In FIG. 6, a first circuit design 602 includes next-state transition functions Tr and design constraints C, along with an associated set of properties P. FIG. 6 also shows a second circuit design 604 (which in this example is a second version of the circuit design 602) including next-state transition functions Tr' and the design constraints C, along with an associated set of properties P'. The sets of properties P and P' captures the expected behavior of their respective circuit designs 602, 604.

As shown in FIG. 2, a circuit design 202 may go through several changes during its life cycle. These changes can be due to bug-fixes 204 or feature enhancements 208 or even simple refactoring 206 of the code. The verification process 210 may find bugs in the functional aspect of the circuit design. Note that a bug could either be in the circuit design or it could be in specification of a property. In either case, the verification must be redone to ensure correctness of the circuit design. Such an iterative development is not supported in existing formal verification methods and any change triggers formal verification to start from scratch.

FIG. 6, a composite model 606 is a composite of the first and second circuit designs 602, 604, and has constraints Ce and next-state transition functions Tr. Composite circuit model 606 also has associated properties P' constructed from the properties of circuit designs 602, 604 in which ones or more properties from P imply one or more properties from P' (for each property in P'). Formal verification software 608 analyzes the correctness of the composite model 606 and asserts one of the following: (1) property P' holds ("Proof") 610, or (2) property P' is falsified and the tool provides a counter example (CEX) 612 that indicates the failing scenario for property P'. Note that in the described embodiment, if the proof is inconclusive, control passes to a standard method of verifying P' (not shown in FIG. 6). Further note that although the composite model 606 is verified, in at least one embodiment, the proof and counter example output are for the propert(ies) of the second design model P'604, as will be described below. It should be understood that construction of composite circuit design model 606 is created from circuit designs 602 and 604 stored in a memory of a computer system. In one embodiment, construction of model 606 is performed by a processor of a computer system and sequential equivalence checking is also performed by software executed by a processor. In one embodiment, 606 and 608 are part of a single piece of software. In other embodiments, 606 and 608 are separate and 606 communicates the composite circuit design to 608 for verification.

FIG. 7 is a graph showing flow between a differential verification engine 710 and the design process for multiple versions of a circuit design. As shown in FIG. 7, two circuit designs and their associated properties 702 may go through several changes during their life cycle. These changes can be due to bug-fixes 704 or feature enhancements 708 or even simple refactoring 706 of the code. The differential verification process using, .g. differential verification software) 710 may find bugs in the functional aspect of the original and subsequent circuit designs. Note that a bug could either be in the circuit design or it could be in specification of a property. In either case, the verification must be redone to ensure correctness of the revised circuit design. As shown in FIG. 7, the described embodiments use information from previously proven design models (e.g., transfer invariants) to improve the speed and efficiency of verifying subsequent versions of the circuit design.

An Additional Example

Figure 8:
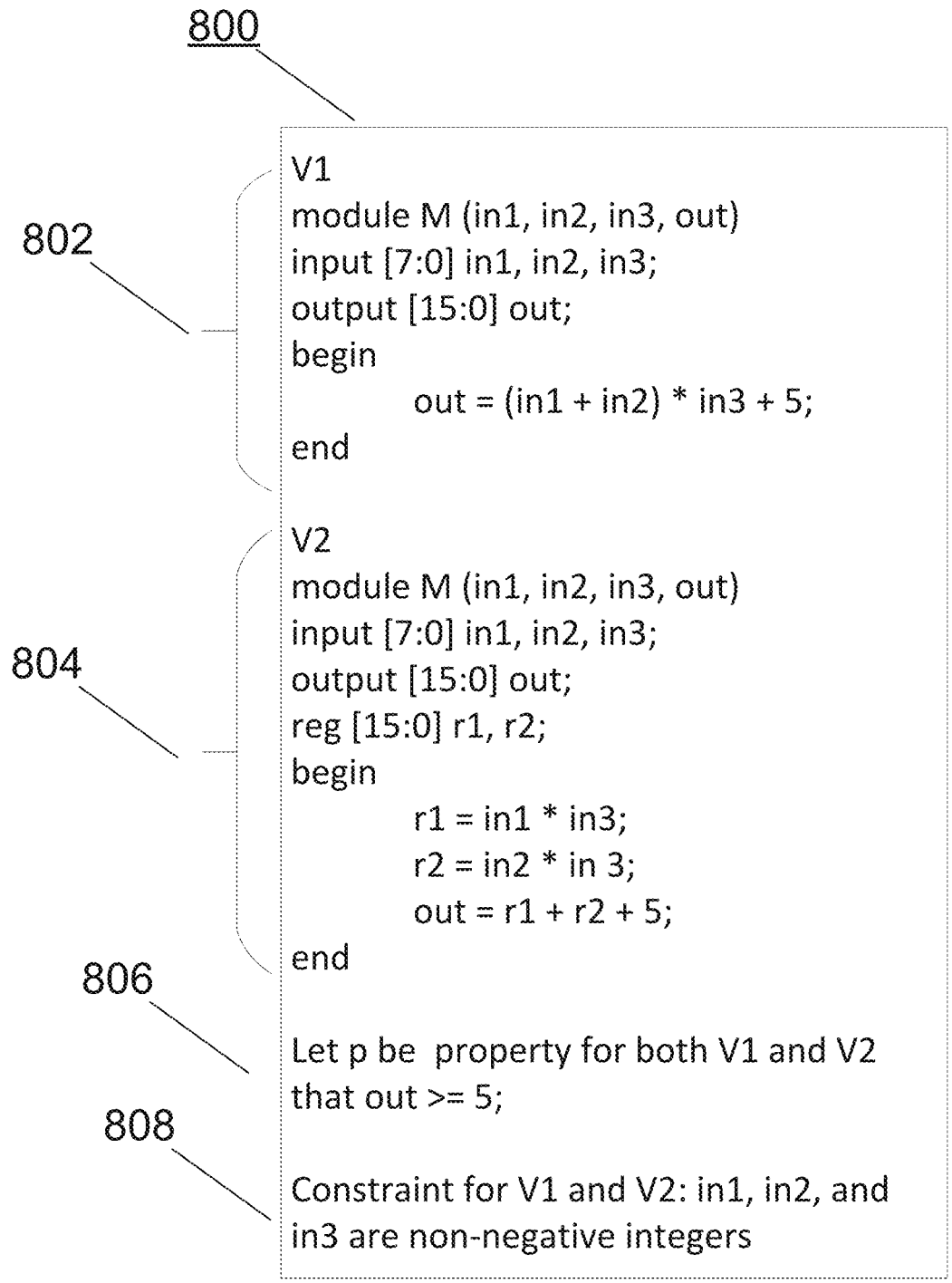
FIG. 8 illustrates an example of two versions of a circuit design written in a hardware description language.

FIG. 8 illustrates an example 800 of two versions 802, 804 of a circuit design written in a hardware description language such as Verilog and stored in a memory of a computer system (also called a data processor). First version V1 802 is as follows:

V1
module M (in1, in2, in3, out)
input [7:0] in1, in2, in3;
output [15:0] out;
begin out=(in1+in2)*in3+5;

end
V1 has the constraint 808 that inputs in1, in2, and in3 are non-negative numbers. Given this constraint, V1 has the property p 806 that "out>=5".

FIG. 9(*a*) illustrates an example of a directed acyclic graph (DAG) 900 representing the design version V1 of FIG. 8. The DAG has three inputs 902: in1, in2, and in3 and one output: out 912. A property p 914 is associated with circuit design V1, specifically p: out>=5. Inputs in1 and in2 are added 904 and the result of the addition 904 is multiplied by in3. The result of the multiplication 906 is added 910 to the value 5 908. The result of addition 910 is output as out 912. It will be understood that DAG 900 may be generated by instructions stored in a memory of a computer system such as main memory 1206 of FIG. 12. Instructions to perform the method of creating a DAG from a hardware description are executed by a processing device such processing device 1202 shown in FIG. 12.

Returning to FIG. 8, version V2 of the hardware descriptor language 804 is as follows:

V2
module M (in1, in2, in3, out)
input [7:0] in1, in2, in3;
output [15:0] out;
reg [15:0] r1, r2;
begin r1=in1*in3;

r2=in2*in3;

out=r1+r2+5;

end
V2 has the constraint 808 that inputs in1, in2, and in3 are non-negative numbers. Given this constraint, V2 has the property p 806 that "out>=5".

FIG. 9(*b*) illustrates an example of a directed acyclic graph (DAG) 950 representing the circuit design version V2 of FIG. 8. The DAG has three inputs 952: in1, in2, and in3 and one output: out 962. A property p' 964 is associated with circuit design V2, specifically p': out>=5. Inputs in1 and in3 are multiplied 954. Inputs in2 and in3 are multiplied 955. The result of the multiplication 954 is added 956 to the result of multiplication 955. The results of multiplications 954 and 955 are added 956. The result of the addition 956 is added 960 to the value 5 958. The result of addition 960 is output as out 962. It will be understood that DAG 950 may be generated by instructions stored in a memory of a computer system (also called a data processor) such as main memory 1206 of FIG. 12. Instructions to perform the method of creating a DAG from a hardware description are executed by a processing device such processing device 1202 shown in FIG. 12.

Note that the two circuit designs V1 (in FIG. 9(*a*)) and V2 (in FIG. 9(*b*)) are syntactically different. Circuit designs V1 and V2 use different arrangements of addition and multiplication operations. The following paragraph describes a method to determine that the circuit design V1 and the circuit design V2 are semantically equivalent. In particular, the system determines that:

(in1+in2)*in3+5 (as shown in FIG. 9(*a*))

is semantically equivalent to ((in1*in3)+(in2*in3))+5 (as shown in FIG. 9(*b*)

To determine semantic equivalence between V1 and V2, the system models the above DAG example using a set of Boolean expressions and uses methods such as Boolean satisfiability (SAT), satisfiability modulo theories (SMT), or binary decision diagram (BDD) to determine whether the Boolean expression:

(in1+in2)*in3+5=((in1*in3)+(in2*in3))+5 evaluates to true.

These are some examples of how the system might determine that portions of V1 and V2 are semantically equivalent. In the example, the system determines that the two circuit designs V1 950 and V2 952 are semantically equivalent using the distributive law of Boolean algebra.

Figure 9A:
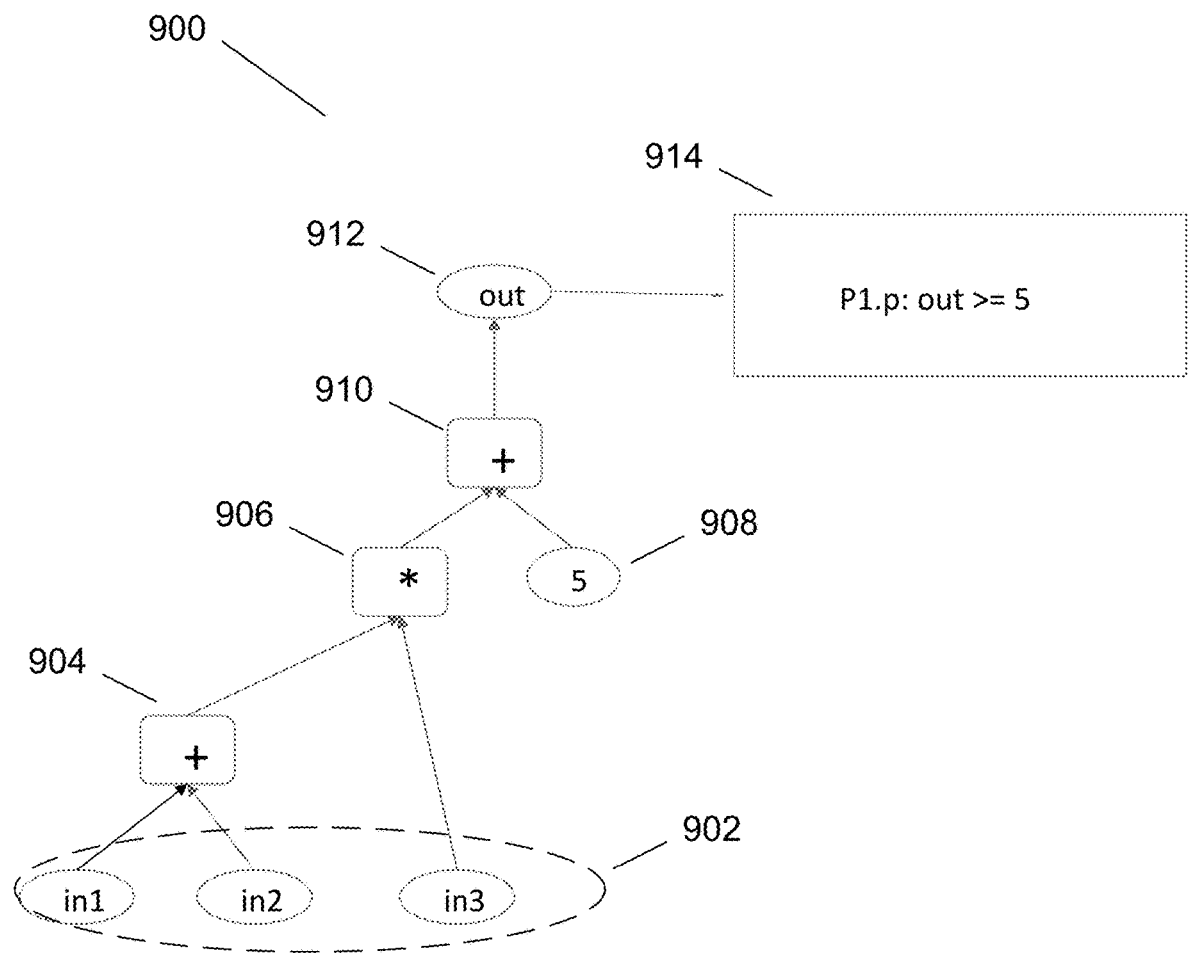
FIG. 9(*a*) illustrates an example of a directed acyclic graph (DAG) representing the first version of the circuit design of FIG. 8.
FIG. 9(b) illustrates an example of a directed acyclic graph (DAG) representing the second version of the circuit design of FIG. 8.
FIG. 9(c) illustrates an example of a directed acyclic graph (DAG) representing a composite of the DAGs of FIGS. 9(a) and 9(b).
FIG. 9(d) illustrates an example of the DAG of FIG. 9(c) where structurally equivalent nets have been determined.
FIGS. 9(e) and 9(f) illustrate examples of finding corresponding properties in the two versions of the circuit design.
Figure 9B:
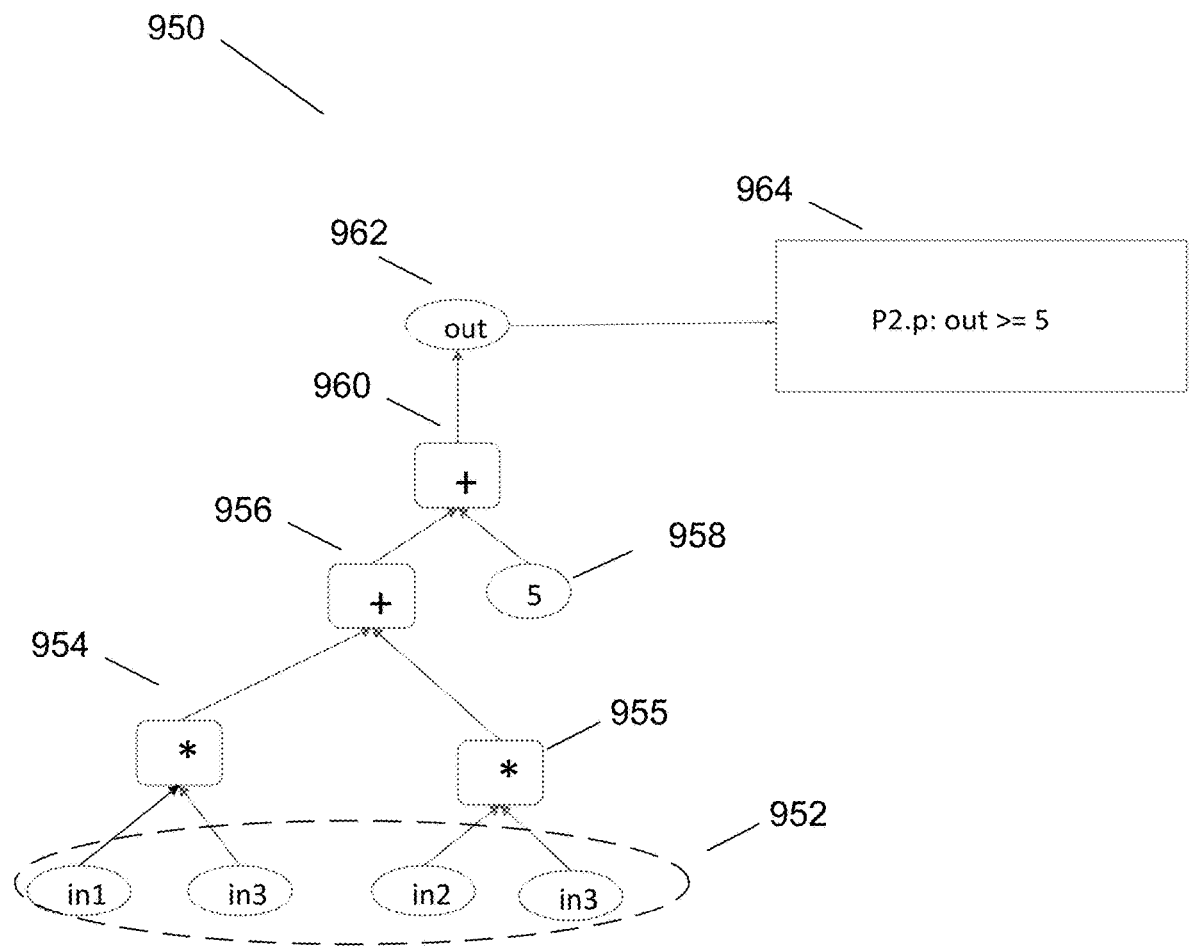
Figure 9C:
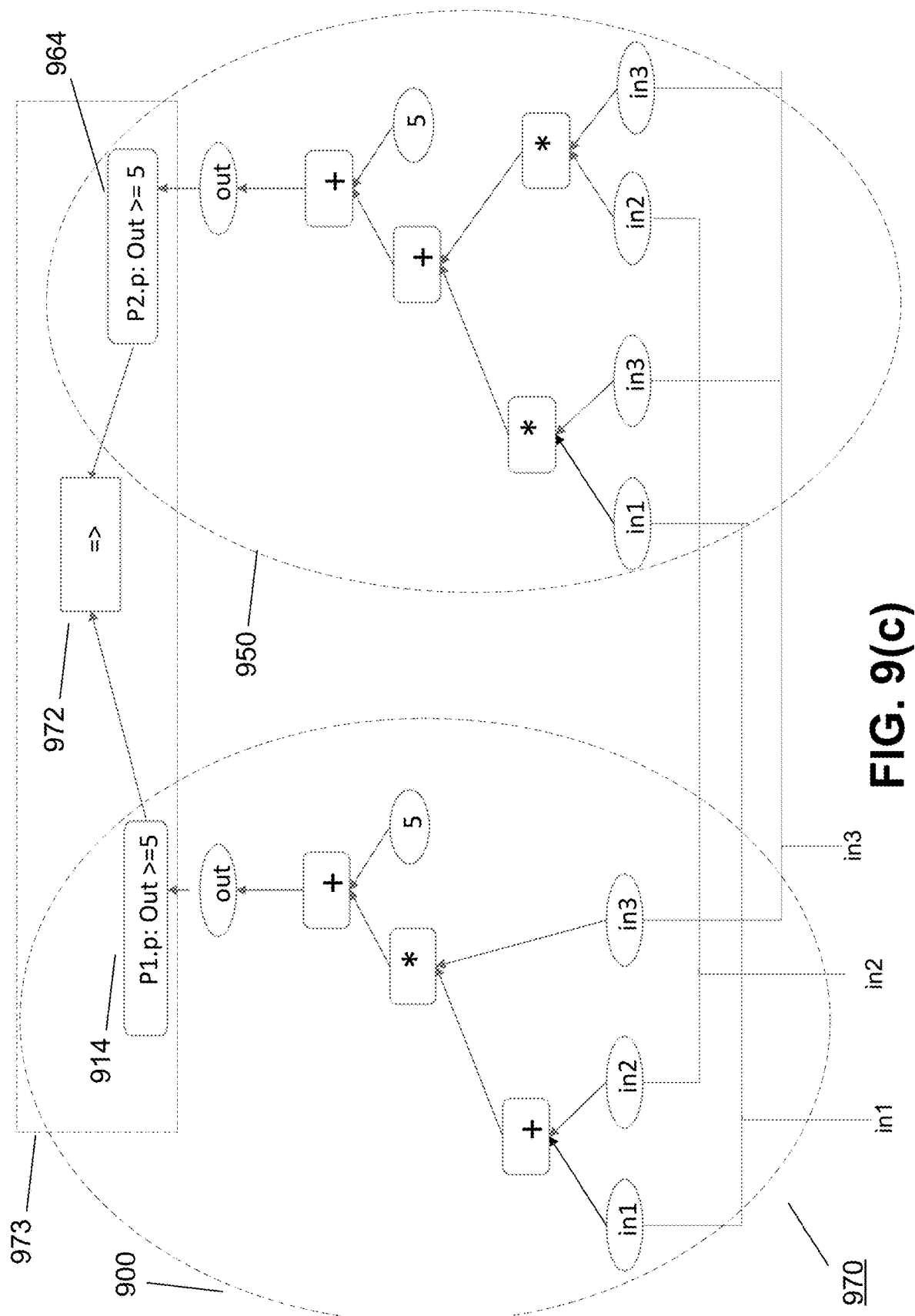
Figure 9D:
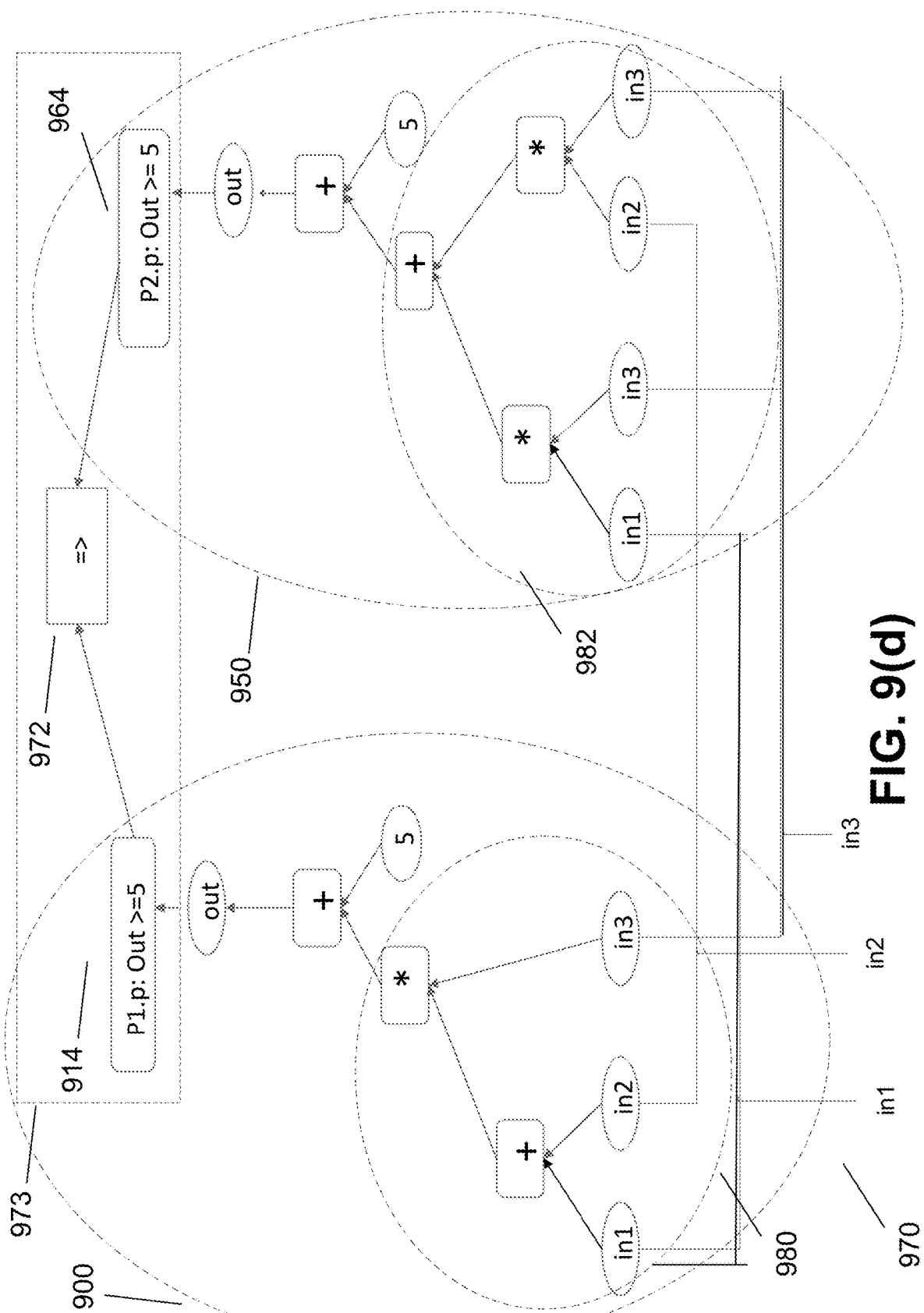

FIG. 9(c) illustrates an example of a DAG 970 stored in a memory of the system and representing a composite 970 of the DAGs of FIGS. 9(a) and 9(b). FIGS. 10(a) and 10(b) illustrate a flowchart of a method to create and analyze the correctness of the composite DAG of FIG. 9(c). FIGS. 9(c), 9(d), 9(e), 10(a) and 10(b) are discussed together below.

FIGS. 10(a) and 10(b) illustrate a flowchart of a method to verify a property in the second version of the design by using a composite design. Specifically, as shown in 1002 and 1004, the method looks at circuit designs V1 and V2, where:

$$V1=<C1,Tr1,P1> \text{ and}$$

$$V2=<C2,Tr2,P2>$$

where C is the set of constraints (which may include initial constraints and invariant constraints), Tr is the next-state function of the circuit design, and P is the set of properties for a design. In this example, the constraints are the datatype and bit-width of the inputs in1, in2, and in3 as shown, respectively, in V1 and V2. Note that both the circuit designs have the same inputs and constraints (all inputs are non-negative). The next-state function provides a description of which state is next for each node in the DAG. Thus, for example, for node 954, a next state is node 956. The next state function provides the next state of the circuit design represented by the DAG.

In 1006, the method checks whether the set of inputs and invariant constraints C1 and C2, are semantically equivalent using the same method(s) as mentioned above. If the constraints of the two circuit designs are not the same or equivalent, there is no point in performing further analysis and processing passes to 1060. If the constraints are not the same or equivalent, then the described method falls back to regular model checking of the property by itself in 1060 and analyzes property P2.p for the second circuit design.

If C1 and C2 are the same or equivalent, the method constructs a composite circuit of the first and second circuit designs. FIG. 9(c) illustrates an example of a DAG 970 representing a composite of the DAGs 900, 950. The composite in this example has merged inputs in1, in2, and in3 (1008 of FIG. 10(a))

Next, the method determines structurally equivalent DAGs in fanout of inputs in Tr1 and Tr2 (the nodes of the DAGs) (1010 of FIG. 10(a)). The method merges equivalent DAGs to construct the next state function of the composite system (see 1012 of FIG. 10(a)).

In 1014, the method creates a new property $p_e$ 973, associated with the composite circuit, for each property p in P2. FIGS. 9(c) and 9(d) both show "implication" 972 that is part of the property $p_e$ 973: P1.p=>P2.p. Thus, in the example, the composite circuit has a property $p_e$ 973m that (P1.p is true) implies (P2.p is true). The property $p_e$ 973 will be proved or disproved (or inconclusive) during verification of the composite circuit, as discussed below.

Figure 9E:
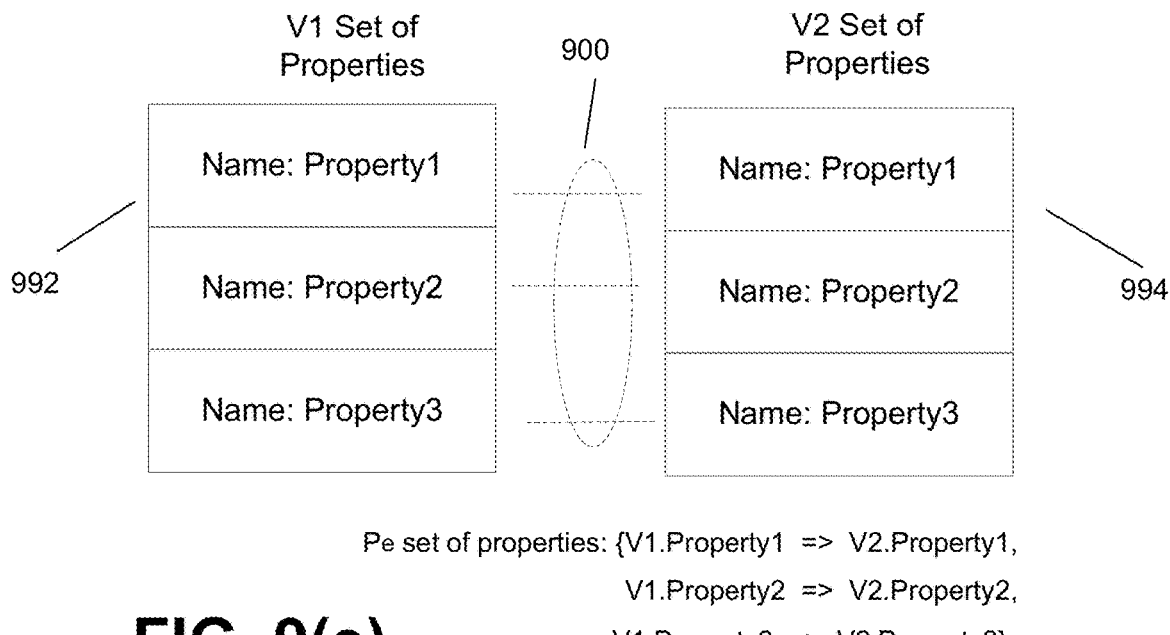
Figure 9F:
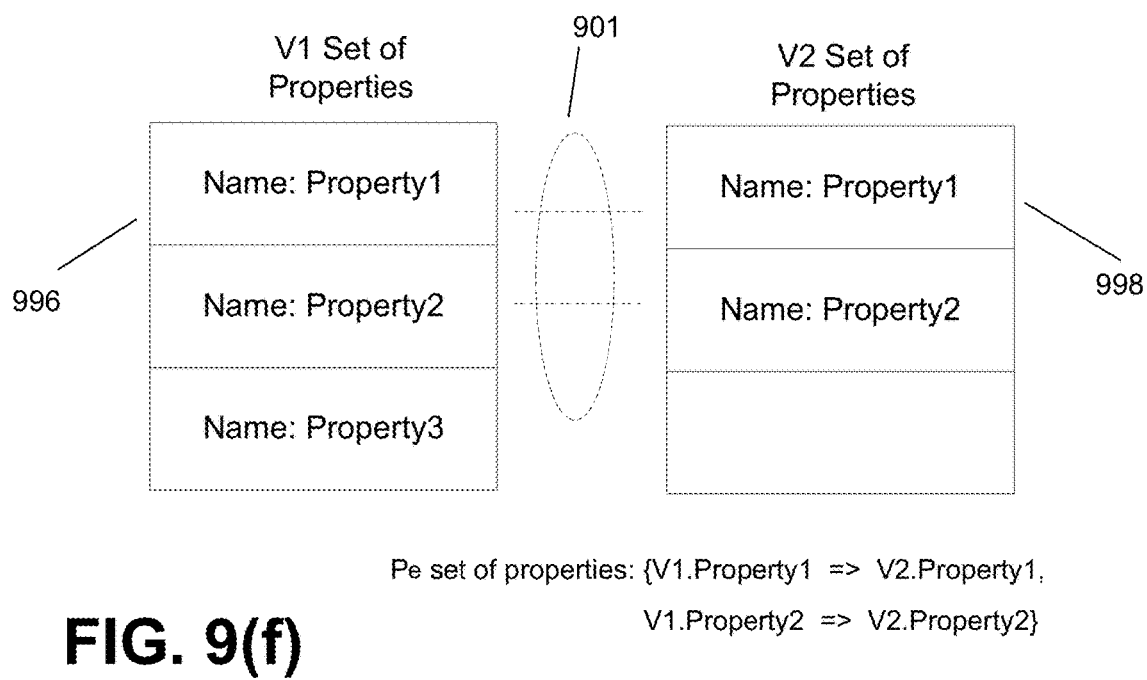
Figure 10A:
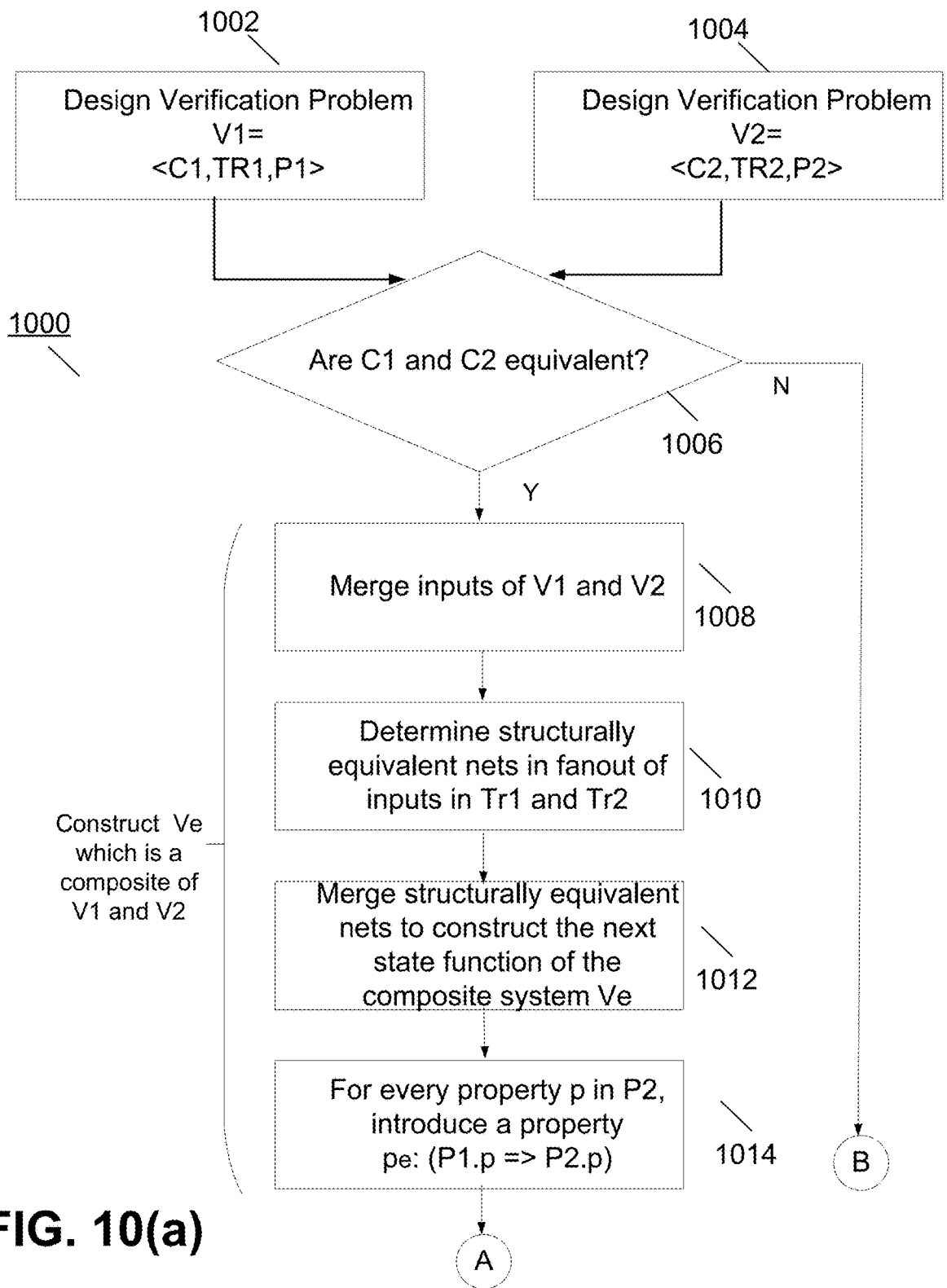
FIGS. 10(a) and 10(b) illustrate a flowchart of a method to verify a property in the second version of the design by using a composite design.
Figure 10B:
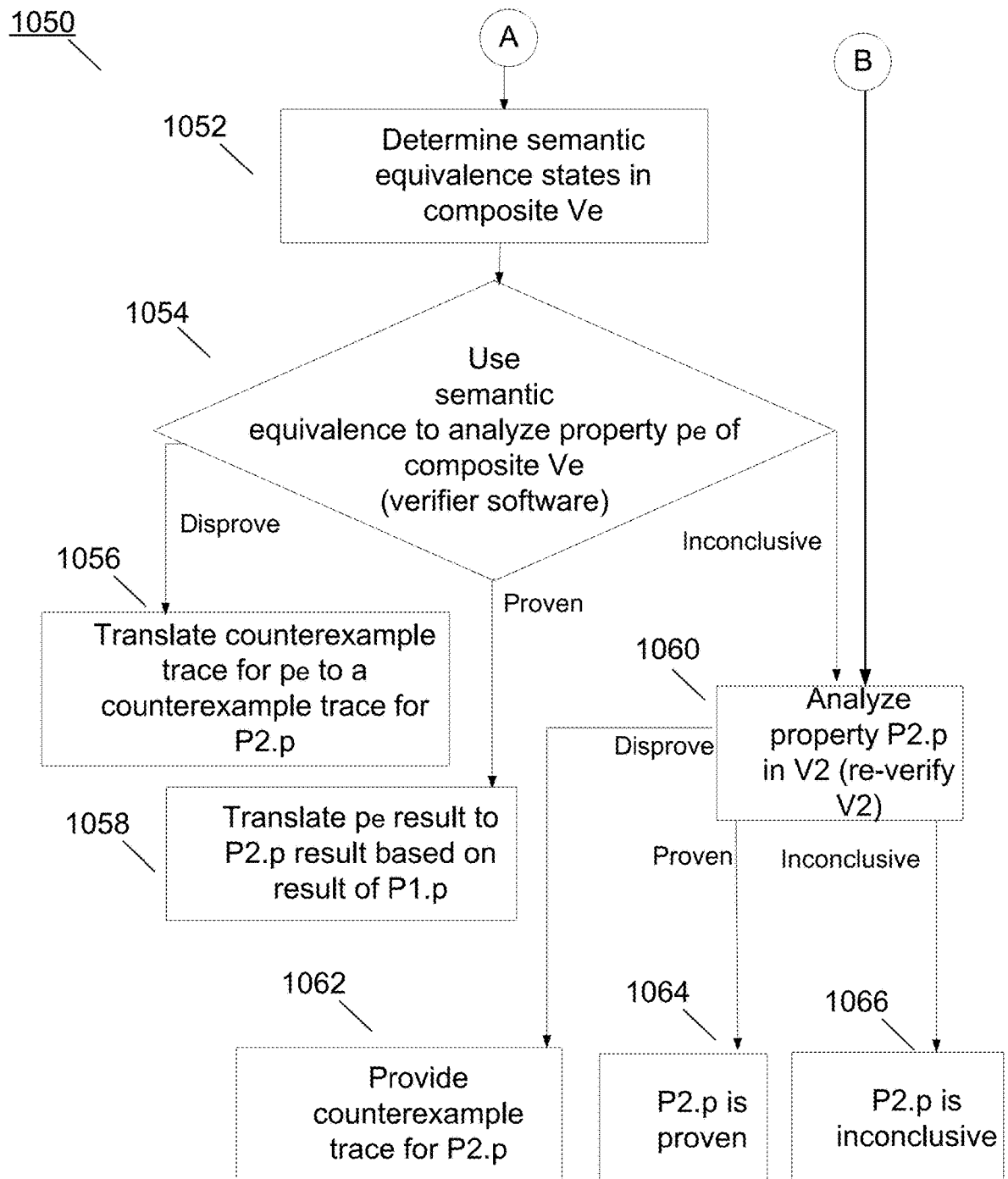

FIGS. 9(e) and 9(f) illustrate an example of determining corresponding properties in two versions of a circuit design. Finding corresponding properties is used in, for example, 1014 of FIG. 10(a). There are many possible ways to determine whether properties of two circuit designs "match" and thus, should form part of a new property for the composite of the two circuit designs. In the example of FIGS. 9(e) and 9(f) the circuit designs V1 and V2 have named properties ("Property1", "Property2", "Property3"). (Note that property names are not shown in FIGS. 9(a)-9(d) for the sake of clarity.) In the example, the method determines whether properties should be "matched" by comparing the property names. If the property names are the same, the properties should be matched to form a new property. Thus, in FIG. 9(e), circuit design V2 has a data structure 994 containing three named property names f of V2. These properties have the same names as properties 992 of circuit design V1. Thus, all three properties of V2 "match" 900 corresponding properties of circuit design V1 and will be used by the method to form three properties for the composite of V1 and V2 in 1014 of FIG. 10(a). Similarly, in FIG. 9(f), circuit design V2 has a data structure 998 containing two named properties for V2. These properties have the same names as properties 996 of circuit design V1. Thus, both properties of V2 "match" 901 corresponding properties of circuit design V1 and can be used by the method to form two properties for the composite of V1 and V2. Property3 of V1 will not be used to form a new property for the composite. Other embodiments may use alternative ways of determining matching properties. For example, the method may determine to match two properties that have the same syntactic expressions describing them. Any appropriate way of matching properties may be used.

Thus, the composite circuit Ve has constraints, a DFG representing the next state function, and one or more associated properties $p_e$.

In 1052 of FIG. 10(b), the method uses sequential equivalence checking technology to determine semantic equivalent nets in Ve. Two nets, for example, n1 and n2, are sequentially equivalent if starting at any initial state, the sequence of values at n1 and n2 are equal for any sequence of values assigned to the primary inputs of Ve. The system uses sequential equivalence checking, which uses reachability analysis techniques based on BDDs, interpolation, and SAT-based induction to analyze the equivalence of any two nets in Ve.

Once semantic equivalences have been determined (1052) for the composite, the method uses the determined semantic equivalence to analyze property $p_e$(1054). In the described embodiment, this verification is performed using model checking methods based on BDDs, interpolation and SAT-based induction.

FIG. 9(d) shows a DAG 980 from the first version of the circuit that is equivalent to DAG 982 of the second version. Once the equivalent DAGs 980 and 982 are merged, the method can further merge the out node of V1 with the out node of V2 (as they have the equivalent fan in DAGs and therefore are equivalent), thereby proving that the two circuit designs in this example are equivalent. Note that although in this example the two circuit designs V1 and V2 are equivalent, it is not necessary for the two circuit designs to be completely equivalent. The method can benefit as long as some parts of the circuit designs are equivalent.

Thus, in this example, it is known that the property "out>=5" is true for the first version V1 of the circuit design. To verify the property on V2, the second version of the circuit design, instead of verifying the property again, the method determines the semantic equivalence of V1 and V2 with respect to the property "out>=5", and determines that the property holds for V2 since it holds for V1.

To analyze the equivalences between V1 and V2:
The method first creates a composite Ve, where inputs of V1 and V2 are merged
Then the method checks if the property $p_e$ defined as P1.p=>P2.p holds in Ve
If the above property holds in the composite system, all behaviors of V1 (allowed by p) are also behaviors of V2. As a result, the property p holds in V2 also.

As shown in FIG. 6 above, analysis 1054 will result in a proof for property $p_e$ of the composite, a counterexample for property $p_e$ of the composite, or will be inconclusive for property $p_e$. Recall that the method is to verify the property P2.p in circuit design V2. Thus, in the described embodiment, the method translates the counterexample, proof, or inconclusive result for a property of the composite system Ve to a counterexample, proof, or inconclusive result for the property of the circuit design V2 (i.e., for property P2.p). Therefore, in the described embodiment, the method will output one of:

1) Translate counterexample trace for $p_e$ to a counterexample trace for P2.p (in 1056). In the described embodiment, this means outputting the portion of a counterexample for $p_e$ that is applicable to P2.p (see 1056)
2) Translate $p_e$ result to P2.p result based on result of P1.p. Thus, if $p_e$ is proved, the output will say that P2.p is proved. (see 1058), or If 1054 gives an inconclusive result, control passes to 1060, where the property P2.p is verified for the second circuit design in a standard manner. This is sometimes referred to as the second circuit design being "re-verified" since an earlier version of the circuit design was verified previously.

The big picture advantage of this system and method is that it leverages the effort to verify a property in a circuit design to verify the property in subsequent versions of the design. The technique of sequential equivalence checking provides a way to transfer the results of verification between two versions of the circuit design. If a first version of a circuit design has been verified, then the method may determine that it does not need to verify some or all of the subsequent circuit designs when the method determines that the first circuit design and the subsequent circuit design are totally or partially semantically equivalent. A determination that re-verification is not needed for some or all of a circuit design results in savings of time in the circuit design process and reduce the time and effort required to ascertain the correctness of the subsequent versions. The described embodiments construct a composite of the versions of the circuit design and analyzes the composite to determine if some or all of the first and second version of the circuit design are semantically equivalent, and thus do not require re-verification. Semantic equivalence is different from syntactic equivalence and allows circuits that operate in a same or equivalent manner to be re-verified in a speedy and time-efficient manner.

Figure 11:
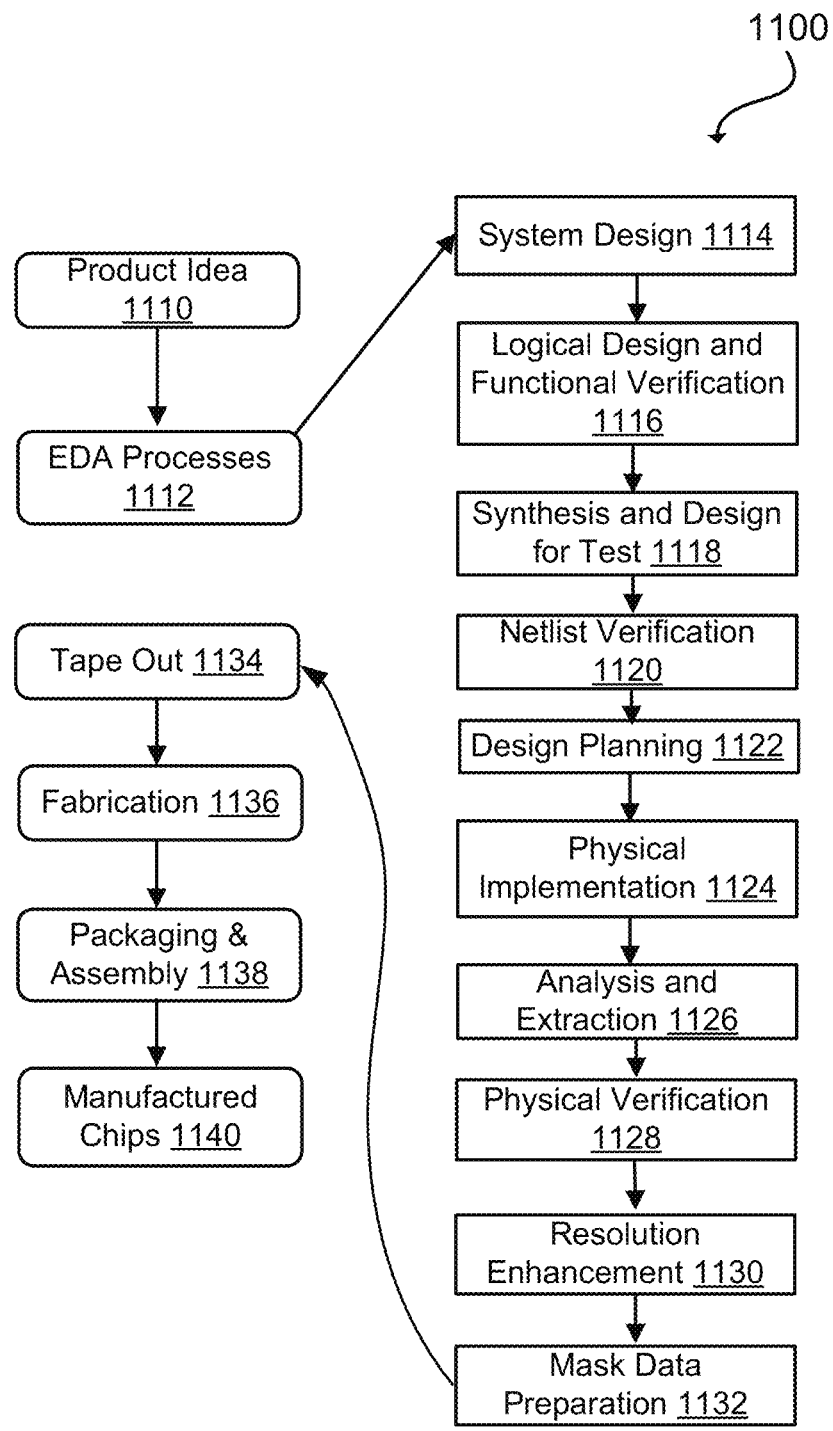
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the circuit design is finalized, the circuit design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 12, also called a data processor) may be used to store the programs and data structures that are used by some or all of the EDA products described herein, and products used for development of cells for the library and for physical and logical design that use the library.

Figure 12:
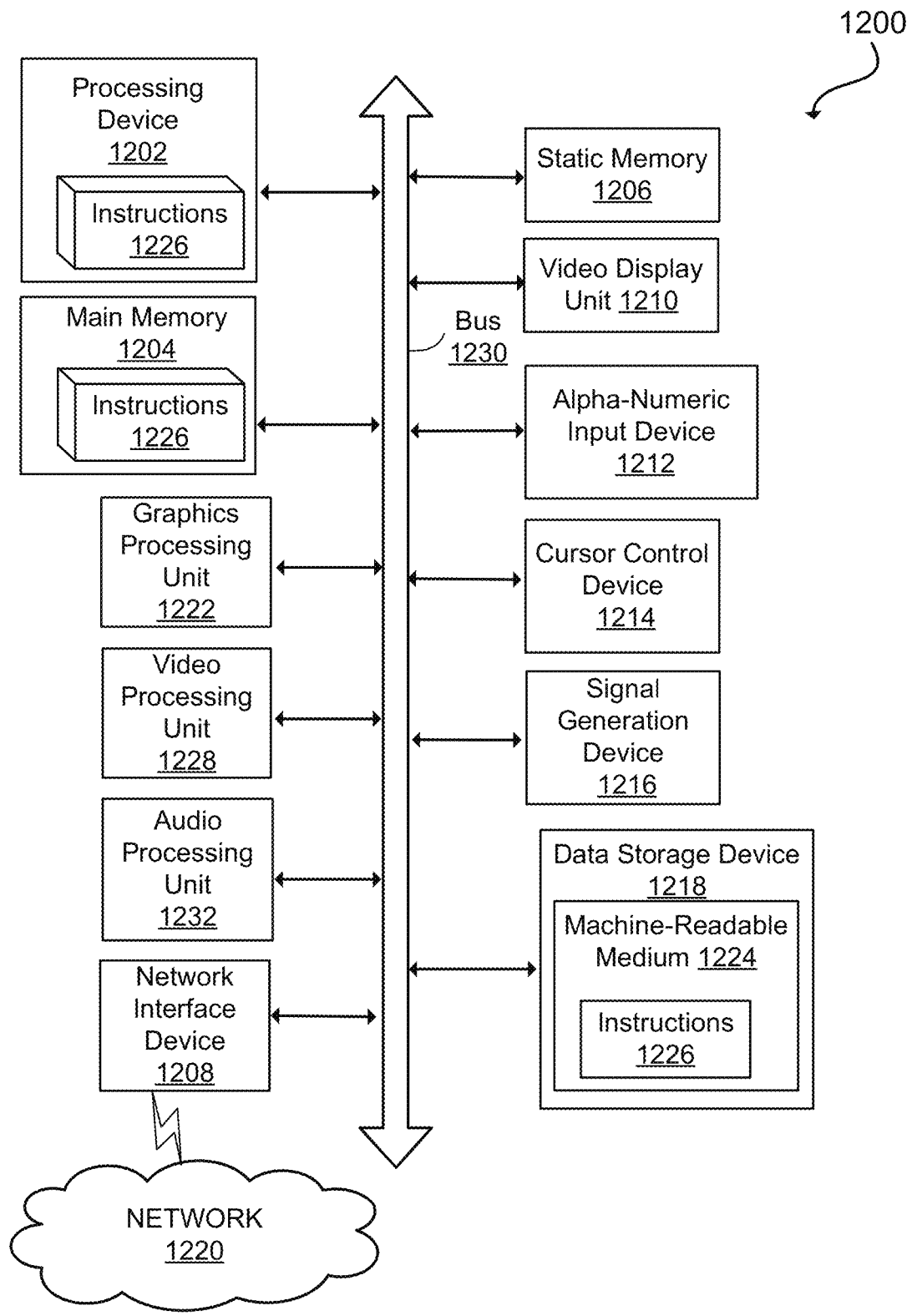
FIG. 12 depicts a diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    receiving a first version of a circuit design and storing the first version of the circuit design in a memory, where the received first version has a first set of constraints, a first set of next-state functions representing the first version of the circuit design, and a first property that has been verified as true for the first version of the circuit design;
    receiving a second version of the circuit design and storing the second version of the circuit design in the memory, where the received second version has a second set of constraints, a second set of next-state functions representing the second version of the circuit design, and a second property for the second version of the circuit design;
    constructing, by a processor, a composite circuit design based on the first set of constraints, the first set of next-state functions, and the first property and further based on the second set of constraints, the second set of next-state functions, and the second property; and
    constructing a third property for the composite circuit design in which the first property implies the second property.

2. The method of claim 1, wherein constructing the composite circuit design further comprises merging a first set of inputs of the first version of the circuit design and a second set of inputs of the second version of the circuit design to form inputs of the composite circuit design.

3. The method of claim 1, wherein constructing the composite circuit design further comprises:
    determining structurally equivalent nets in the first version of the circuit design and the second version of the circuit design; and
    merging the determined structurally equivalent nets in the composite circuit design.

4. The method of claim 1, wherein the first version of the circuit design has a fifth property and the second version of the circuit design has a sixth property, wherein the fifth property and the sixth property match and further comprising constructing a fourth property for the composite circuit design in which the fifth property of the first version of the circuit design implies the sixth property of the second version of the circuit design.

5. The method of claim 1,
    wherein the first version of the circuit design and the second version of the circuit design have one or more properties; and
    wherein constructing the third property for the composite circuit design further comprises matching the second property of the second version of the circuit design to the first property of the first version of the circuit design and using the matched properties to construct the third property of the composite circuit design.

6. The method of claim 5, wherein matching the second property of the second version of the circuit design to the first property of the first version of the circuit design further comprises matching the first property and the second property by their property names.

7. The method of claim 5, wherein matching the second property of the second version of the circuit design to the first property of the first version of the circuit design further comprises matching the first property and the second property by their syntactic expression.

8. The method of claim 1, further comprising:
    determining semantic equivalent states for the composite circuit design; and
    using the determined semantic equivalent states to analyze correctness of the third property of the composite circuit design.

9. The method of claim 8, wherein analyzing correctness of the third property of the composite circuit design further comprises:
    generating for the composite circuit design one or more of: a proof that the third property is true for the composite circuit design, a counterexample trace for the composite circuit design, or an inconclusive result.

10. The method of claim 9, further comprising:
translating the counterexample trace for the composite circuit design to a counter example trace for the second property of the second version of the circuit design, and
outputting the counter example trace for the second property of the second version of the circuit design, so that the output appears to be for the second version of the circuit design.

11. The method of claim 9, further comprising:
translating the proof that the third property is true for the composite circuit design to a result based on the first version of the circuit design, and
outputting the result based on the first version of the circuit design, so that the output appears to be a proof for the second version of the circuit design.

12. The method of claim 9, further comprising when the inconclusive result is generated, verifying the second property of the second version of the circuit design using verification software.

13. The method of claim 1, further comprising:
before constructing the composite circuit design, determining whether the first set of constraints and the second set of constraints are the same; and
when the first set of constraints and the second set of constraints are the same, continuing to construct the composite circuit design.

14. The method of claim 1, further comprising using a determination whether a portion of the first version of the circuit design and a portion of the second version of the circuit design are semantically equivalent to verify a property in the composite circuit design.

15. An apparatus, comprising:
a memory storing instructions; and
a processor, coupled with the memory and to execute the instructions, the instructions when executed cause the processor to:
receive a first version of a circuit design, where the first version has a first set of constraints, a first set of next-state functions representing the first version of the circuit design, and a first property that has been verified as true for the first version of the circuit design;
receive a second version of the circuit design, where the received second version has a second set of constraints, a second set of next-state functions representing the second version of the circuit design, and a second property for the second version of the circuit design;
construct a composite circuit design based on the first set of constraints, the first set of next-state functions, and the first property and further based on the second set of constraints, the second set of next-state functions, and the second property; and
construct a third property for the composite circuit design in which the first property implies the second property.

16. The apparatus of claim 15, wherein the first version of the circuit design has a fifth property and the second version of the circuit design has a sixth property, wherein the fifth property and the sixth property match and further comprising constructing a fourth property for the composite circuit design in which the fifth property of the first version of the circuit design implies the sixth property of the second version of the circuit design.

17. The apparatus of claim 15, further comprising instructions stored in the memory that, when executed by the processor, cause the processor to:
determine semantic equivalent states for the composite circuit design; and
use the determined semantic equivalent states to analyze correctness of the third property of the composite circuit design.

18. The apparatus of claim 15, further comprising instructions stored in the memory that, when executed by the processor, cause the processor to:
analyze correctness of the third property for the composite circuit design; and
generate for the second property of the second version of the circuit design one of the following: a proof that the second property is true for the second version of the circuit design; a counterexample trace for the second version of the circuit design; and a result of inconclusive.

19. A non-transitory computer readable medium comprising stored instructions, which when executed by a processor, cause the processor to:
receive a first version of a circuit design and store the first version of the circuit design in a memory, where the received first version has a first set of constraints, a first set of next-state functions representing the first version of the circuit design, and a first property that has been verified as true for the first version of the circuit design;
receive a second version of the circuit design and storing the second version of the circuit design in the memory, where the received second version has a second set of constraints, a second set of next-state functions representing the second version of the circuit design, and a second property for the second version of the circuit design;
construct a composite circuit design based on the first set of constraints, the first set of next-state functions, and the first property and further based on the second set of constraints, the second set of next-state functions, and the second property;
construct a third property for the composite circuit design in which the first property implies the second property; and
analyze the third property for the composite circuit design, to generate one or more of a proof that the second property is true for the second version of the circuit design and a counterexample trace for the second version of the circuit design.

20. The non-transitory computer readable medium of claim 19, wherein the stored instructions further cause the processor to:
determine semantic equivalent states for the composite circuit design; and
use the determined semantic equivalent states to analyze correctness of the third property for the composite circuit design.

* * * * *